(12) United States Patent
Hsieh

(10) Patent No.: US 6,802,234 B2
(45) Date of Patent: Oct. 12, 2004

(54) TRANSMISSION MECHANISM OF DRILLING/MILLING TOOL

(75) Inventor: Pan-Chung Hsieh, Tou Liu (TW)

(73) Assignee: Lee Yeong Industrial Co., Ltd., Yunlin Hsien (TW)

( * ) Notice: Subject to any disclaimer, the term of this patent is extended or adjusted under 35 U.S.C. 154(b) by 0 days.

(21) Appl. No.: 10/284,264

(22) Filed: Oct. 31, 2002

(65) Prior Publication Data

US 2004/0060386 A1 Apr. 1, 2004

(30) Foreign Application Priority Data

Sep. 26, 2002 (TW) ...................................... 91215273 U

(51) Int. Cl.[7] .................................................. F16H 3/08
(52) U.S. Cl. ........................................ 74/810.1; 74/342
(58) Field of Search ................................ 74/810.1, 342, 74/344, 333, 325

(56) References Cited

U.S. PATENT DOCUMENTS 2,903,901 A * 9/1959 MacDonald ................. 74/368
5,159,854 A * 11/1992 Mino et al. ................ 74/810.1
5,557,987 A * 9/1996 Lotsch ...................... 74/810.1
6,609,440 B1 * 8/2003 Chu ......................... 74/810.1

* cited by examiner

*Primary Examiner*—Sherry Estremsky
(74) *Attorney, Agent, or Firm*—Troxell Law Office PLLC

(57) ABSTRACT

Transmission mechanism of drilling/milling tool, including a motor capable of forward and backward rotating. The motor has a transmission shaft for transmitting the power to the transmission mechanism. The transmission mechanism further includes a movable slide gear, a first and a second driven wheels constantly engaged with the slide gear and a brake or shaft mounted on a driving wheel or the driven wheel. The slide gear is responsive to the forward and backward rotation of the transmission shaft to axially move along the brake or shaft to selectively drivingly engage with the first or second driven wheel. In the forward and backward travel of the drill bit or blade, the drill bit or blade is rotated at high or low rotational speed.

9 Claims, 4 Drawing Sheets

TRANSMISSION MECHANISM OF DRILLING/MILLING TOOL

BACKGROUND OF THE INVENTION

The present invention is related to an improved transmission mechanism, and more particularly to a transmission mechanism of drilling/milling tool for controlling the forward and backward travel of the drill bit or blade of the drilling/milling tool.

A conventional drill bit or milling blade is arranged on a table and driven by a motor to rotate or reciprocally move for drilling or milling a work piece. Taiwanese Patent No. 78206140 (Publication No. 146298), No. 79200031 (Publication No. 205746) and No. 83212120 (Publication No. 241592) disclose many typical drilling or milling tools. The conventional drilling tool includes a power drill bit driven by a motor and axially reciprocally movable along the mandrel forward or backward. A reducing device and an induction motor (subsidiary motor) and a rotational mechanism are disposed between the motor and the transmission shaft for transmitting the rotational power of the motor. A transmission mechanism is disposed between the power drill bit and the main body for controlling the drill bit to drivingly couple with the transmission shaft. Accordingly, the drill bit can be rotated and moved forward or backward.

In forward and backward travel of the drill bit or blade, the transmission shaft or mandrel is rotated in reverse directions. Also, the rotational speed of the drill bit or blade in the forward travel is apparently slower than that in the backward travel. This is for preventing the drill bit from damaging the cutting angle of the work piece in the forward operation. In fact, the control of the rotational speed in forward or backward travel is achieved by the reducing device and induction motor. However, it is known by those skilled in this field that the reducing device and induction motor themselves and the peripheral mechanisms cooperating with the reducing device and induction motor are arranged in a complicated state. For example, between the driving gear, driven gear and belt included in the reducing device, at least a wheel shaft having a shaft hole is disposed on two sides of the driven wheel and adapted to the tooth structure of rear section of the main shaft. Accordingly, the driven gear changeably commonly accepts the power transmitted from the driving gear. Therefore, some manufacturers use servomotor which can forward and backward rotate with variable rotational speed instead of the above induction motor and reducing device. This can combine the requirements for operation. However, the cost/price of the servomotor is quite high so that the drilling/milling tool as a whole is quite expensive. This directly affects competition of the product on market.

Representatively speaking, the various types of conventional transmission mechanism applied to the drilling/milling tool fail to achieve both functions of forward and backward rotation and changing rotational speed by means of simple structure and cheaper ordinary motor adapted to the structure.

SUMMARY OF THE INVENTION

It is therefore a primary object of the present invention to provide a transmission mechanism of drilling/milling tool, which has small volume and simplified structure applicable to hand tool. In the reciprocal forward and backward travel of the drill bit or blade, the drill bit or blade can be forward or backward rotated at changeable corresponding low or high rotational speed. This eliminates the problems of complicated structure and high cost for the servomotor existing in the conventional device.

According to the above object, the transmission mechanism of drilling/milling tool includes an ordinary motor having a transmission shaft capable of forward and backward rotating. The transmission mechanism is able to transmit the power of the transmission shaft to the drill bit or blade. The transmission mechanism includes a slide gear movable along a longitudinal reference axis and a first and a second driven wheels engaged with the slide gear. The slide gear and the first driven wheel or the second driven wheel has a brake or shaft assembled therewith. The slide gear is responsive to the forward and backward rotation of the transmission shaft to selectively drivingly engage with the first or second driven wheel so as to change the rotational speed at the power output end.

The brake of shaft at least has a threaded section. The slide gear is formed with an inner thread for screwing with the threaded section of the brake of shaft. Within a set range, the slide gear is permitted to axially upward move along the threaded section of the brake or shaft. In the forward travel of the drill bit or blade, only the first drive wheel is driven to create forward rotation at slow speed at the output end. In the backward travel of the drill bit or blade, along with the reverse rotation of the transmission shaft, the small ratio gear of the second driven wheel is selectively driven to create rotation at high speed at the output end.

The present invention can be best understood through the following description and accompanying drawings wherein:

DETAILED DESCRIPTION OF THE PREFERRED EMBODIMENT

Figure 1:
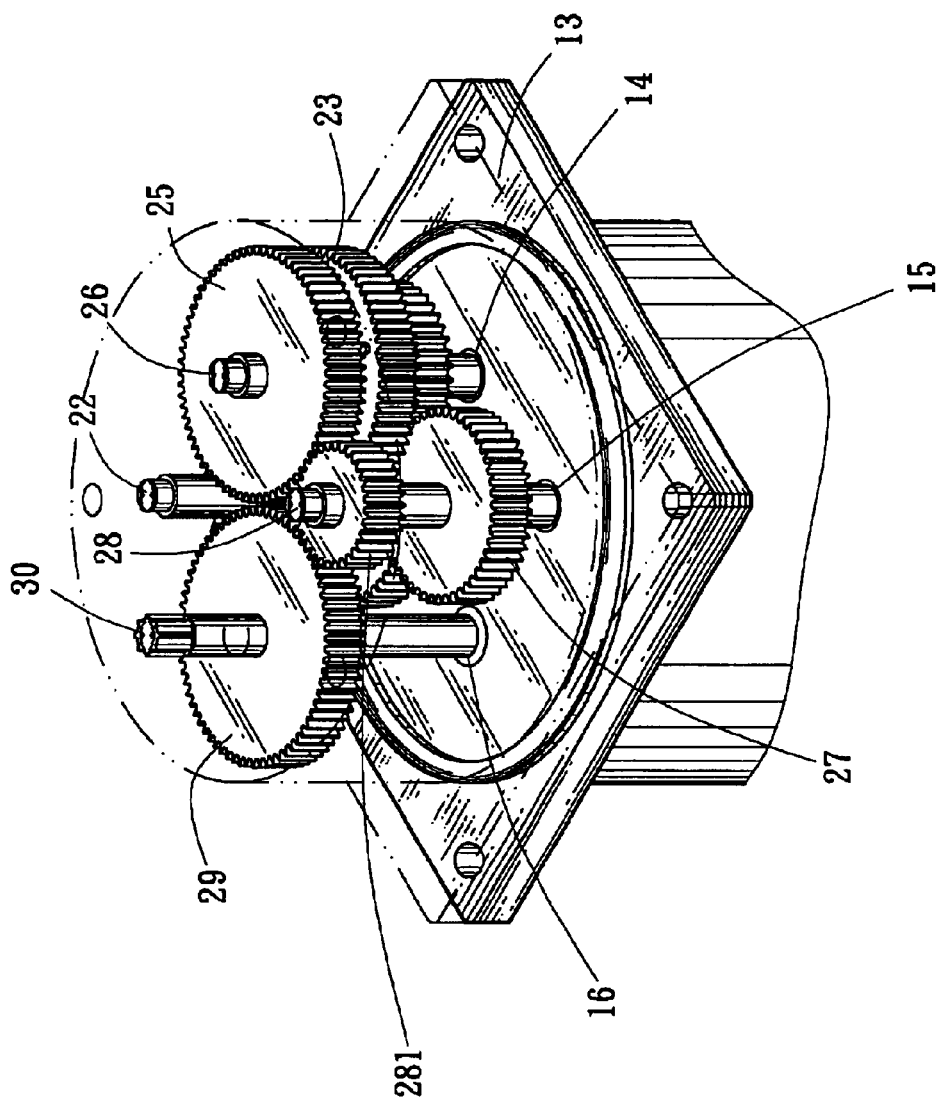
FIG. 1 is a perspective assembled view of the transmission mechanism of the present invention.
Figure 2:
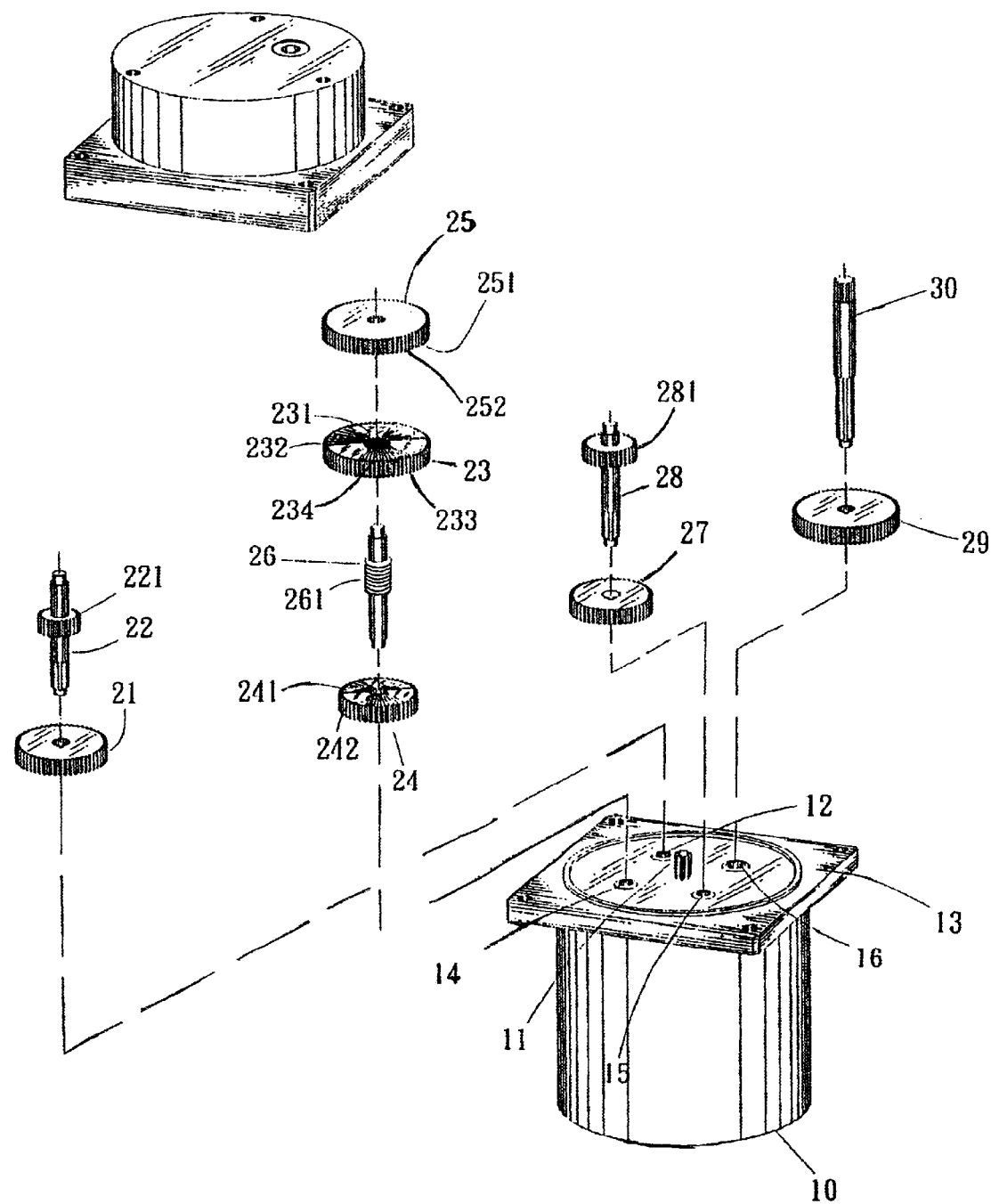
FIG. 2 is a perspective exploded view of the transmission mechanism of the present invention.

Please refer to FIGS. 1 and 2. The transmission mechanism 20 of the present invention is driven by a motor 10 which can be an ordinary one. In practice, the transmission mechanism 20 is driven by the motor 10 via a current converting unit. For example, when the motor 10 is controlled to forward rotate, the transmission mechanism 20 is driven by eight-pole electrode. When the motor 10 backward rotates, the transmission mechanism 20 is driven by fourpole electrode. (This pertains to prior art and will not be further described hereafter.) The motor 10 has a transmission shaft 11 assembled with the transmission mechanism 20.

Figure 3:
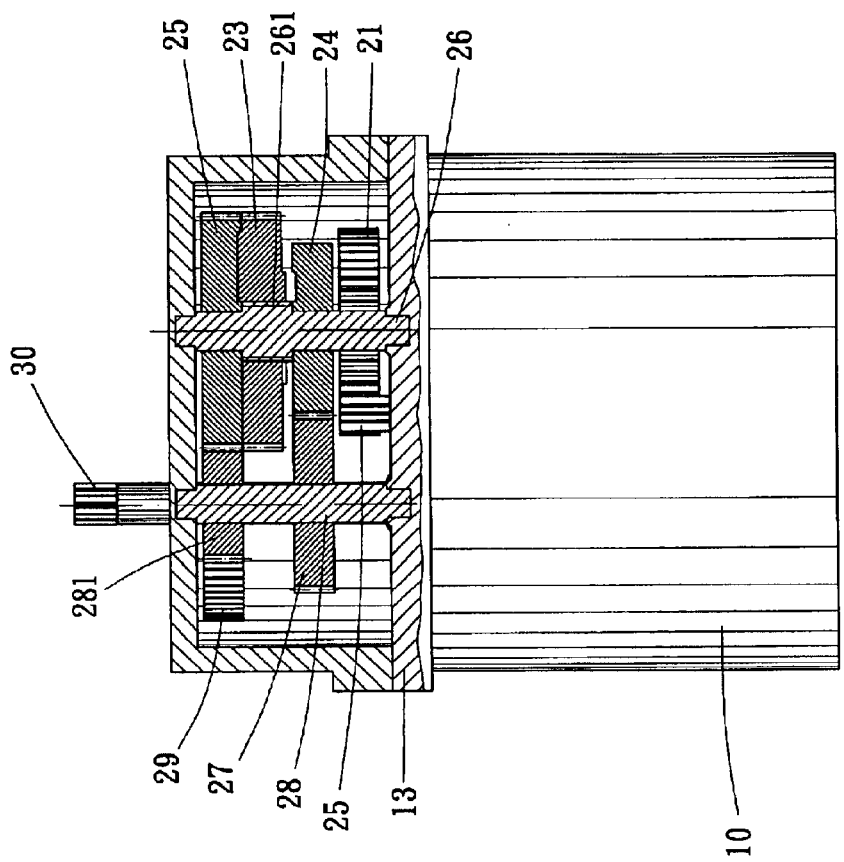
FIG. 3 is a sectional view of the transmission mechanism of the present invention in the forward travel of the blade.

In a preferred embodiment, the transmission mechanism 20 includes a driving wheel 21 driven by the transmission shaft 11. The driving wheel 21 has a coupling shaft 22 pivotally connected with the driving wheel 21. The coupling shaft 22 is mounted in a hole 12 of an end face 13 of the housing of the motor 10. FIG. 3 shows that a toothed wheel 221 is disposed on a substantially belly section of the coupling shaft 22. In this embodiment, the toothed wheel 221 serves to drive a slide gear 23. The slide gear 23 is mounted on a brake or a shaft 26 together with a first and a second driven wheels 24, 25 to form a complex pattern.

Please refer to FIG. 2. The brake or shaft 26 is mounted in another shaft hole 14 of the end face 13 of the housing of the motor 10. The shaft 26 is formed with a large diameter section the circumference of which is formed a threaded section 261. The slide gear 23 is formed with an inner thread 231 for engaging with the brake or shaft 26. Within a set range, the slide gear 23 is permitted to axially upward move along the threaded section 261 of the brake or shaft 26. (This will be further described hereinafter.)

In this embodiment, the slide gear 23 also has brake blocks or faces 234 respectively formed on upper and lower end faces 232, 233 of the slide gear 23. During the displacement of the slide gear 23, the brake blocks or faces 234 serve to selectively drivingly couple with insertion blocks or faces 242, 252 disposed on end faces 241, 251 of the first and second driven wheels 24, 25.

FIGS. 1 and 2 also show that a subsidiary wheel 27 is engaged with the first driven wheel 24 and mounted on a splined shaft 28 disposed in a hole 15 of the end face 13 of the housing. The splined shaft 28 has a toothed wheel section 281 engaged with the second driven gear 25 and a linking gear 29.

The linking gear 29 is mounted on a power output shaft 30 disposed in a hole 16 of the end face 13 of the housing. The linking gear 29 serves to make the power output shaft 30 drive the drilling/milling blade to rotate forward or backward.

Please refer to FIG. 3 which shows a state that the motor 10 drives the rotary shaft 11 to rotate forward. In this state, the driving wheel 21 via the coupling shaft 22 drives the slide gear 23 to rotate. The inner thread 231 of the slide gear 23 is screwed with the threaded section 261 of the brake or shaft 26 so that the slide gear 23 will axially move downward along the brake or shaft 26 until the brake block or face 234 of the lower end face 233 is engaged with the insertion block or face 242 of the first driven wheel 24. Under such circumstance, the first driven wheel 24 is forced to drive the subsidiary wheel 27 and splined shaft 28 to rotate. Then, via the linking gear 29 and the power output shaft 30, the drilling/milling blade is driven and rotated. At this time, the second driven wheel 25 is not engaged with the slide gear 23 so that the second driven wheel 25 idles without interfering with the operation of the drill bit or blade.

Figure 4:
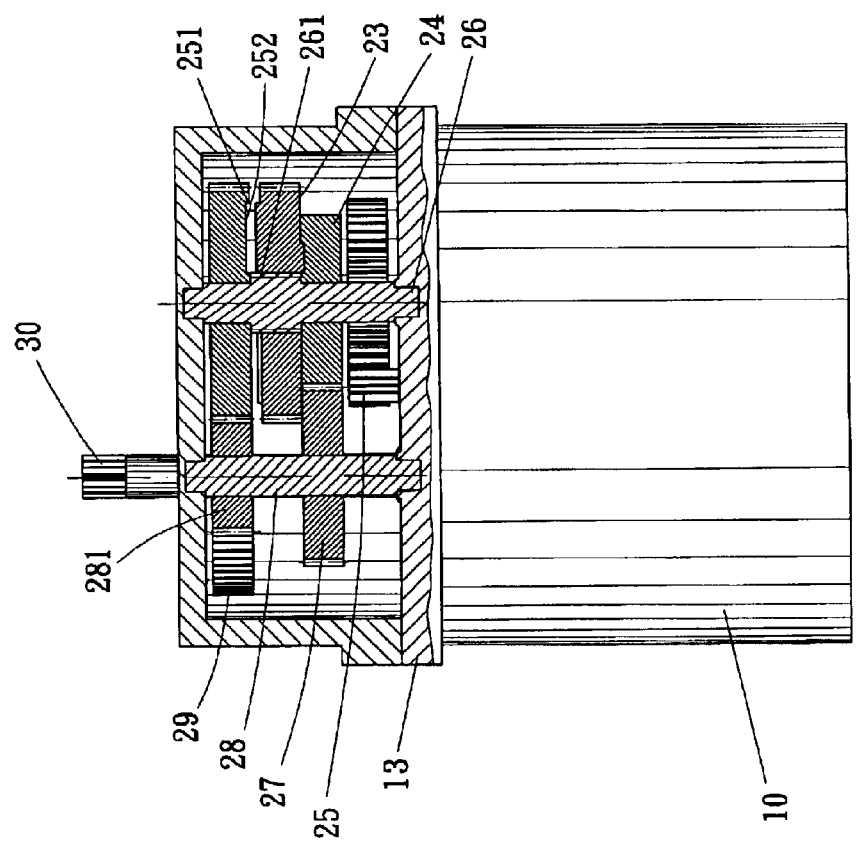
FIG. 4 is a sectional view of the transmission mechanism of the present invention in the backward travel of the blade.

Please refer to FIG. 4. In backward travel of the drill bit or blade, the motor 10 is controlled by the current converting unit to drive the rotary shaft 11 to reversely rotate. Via the coupling shaft 22, the driving wheel 21 drives the slide gear 23 to reversely rotate and axially move upward along the brake or shaft 26 until the brake block or face 234 of the upper end face 232 is engaged with the insertion block or face 252 of the second driven wheel 25. Under such circumstance, the second driven wheel 25 is forced to via the toothed wheel section 281 drive the splined shaft 28 and linking gear 29 to rotate. Accordingly, the power output shaft 30 transmits power to the drilling/milling blade to reversely rotate the same. At this time, the first driven wheel 24 is not engaged with the slide gear 23 so that the first driven wheel 24 idles.

It should be noted that via the slide gear 23 in cooperation with the brake or shaft 26, the transmission mechanism 20 can be axially moved to selectively drivingly engage with the first driven wheel 24 or the second driven wheel 25. Through the toothed wheel section 281 and the linking gear 29, the gear ratio of the transmission mechanism 20 to the first and second driven wheels 24, 25 can be designed as required. For example, in this embodiment, when the rotary shaft 11 forward rotates, the gear ratio of the first driven wheel 24 to the subsidiary wheel 27 is such that the blade is forwarded at slow rotational speed. The gear ratio of the second driven wheel 25 to the toothed wheel section 281 is such that the blade is retreated at high rotational speed.

In conclusion, the transmission mechanism of drilling/milling tool employs complex first and second driven wheels 24, 25 in cooperation with the slide gear 23 and the brake or shaft 26 to simplify the reducing device and clutch mechanism of the conventional drilling/milling tool. The forward and backward travel of the drill bit or blade is responsive to the forward and backward rotation of the motor to create operation at high or low rotational speed. The high rotational speed can be several times the low rotational speed. The present invention is specifically applicable to small-size drilling/milling tool. In addition, the problem of high cost for servomotor of the conventional device is also improved.

The above embodiment is only used to illustrate the present invention, not intended to limit the scope thereof. Many modifications of the above embodiment can be made without departing from the spirit of the present invention.

What is claimed is:

1. A tranamission A transmission mechanism of drilling/milling tool, comprising a motor having a transmission shaft which rotates forward and backward and a transmission mechanism for transmitting and outputting the power of the transmission shaft to a drill bit, said transmission mechanism being characterized by:

a driving wheel for driving a slide gear;

a brake on which the slide gear is mounted together with a first and a second driven wheels to form a complex pattern, the slide gear being responsive to the forward and backward rotation of the transmission shaft to axially move along the brake to selectively drivingly engage with one of the first and second driven wheel, whereby in the forward and backward travel of the drill bit, the drill bit is rotated at high or low rotational speed; and a splined shaft mounted in a hole of an end face of the housing of the motor, the splined shaft having a toothed wheel section engaged with the second driven wheel.

2. The transmission mechanism of drilling/milling tool as claimed in claim 1, wherein the driving wheel is mounted on a coupling shaft having a toothed wheel, whereby the toothed wheel of the coupling wheel drives the slide gear to axially move along the brake.

3. The transmission mechanism of drilling/milling tool as claimed in claim 1, wherein the slide gear is mounted on the brake together with the first and the second driven wheels, the slide gear being formed with an inner thread for screwing with a threaded section of the brake, the slide gear further having an upper and a lower end face, a brake block being disposed on each of the upper and lower end faces for selectively engaging with one of the first and second driven wheel in the travel of the slide gear.

4. The transmission mechanism of drilling/milling tool as claimed in claim 3, wherein an end face of each of the first and second driven wheels is formed with an insertion block.

5. The transmission mechanism of drilling/milling tool as claimed in claim 1, wherein the first driven wheel is engaged with a subsidiary wheel mounted on the splined shaft.

6. The transmission mechanism of drilling/milling tool as claimed in claim 1, wherein the toothed wheel section of the splined shaft is engaged with a linking gear mounted on a power output shaft.

7. The transmission mechanism of drilling/milling tool as claimed in claim 1, wherein the brake is mounted in a shaft hole of an end face of the housing of the motor.

8. The transmission mechanism of drilling/milling tool as claimed in claim 1, wherein the first driven wheel is drivingly engaged with a linking gear and the first driven wheel has a diameter that is smaller than a diameter of the linking gear.

9. The transmission mechanism of drilling/milling tool as claimed in claim 1, wherein the toothed wheel section of the splined shaft is engaged with the second driven wheel and the toothed wheel section has a diameter smaller than a diameter of the second driven wheel.

\* \* \* \* \*